Dec. 16, 1930.                A. L. DUNCAN                 1,785,003
              FRUIT PITTING AND CORING METHOD AND APPARATUS
                    Filed Sept. 28, 1926      3 Sheets-Sheet 1

Inventor
Arthur L. Duncan
By William A. Strauch
Attorney

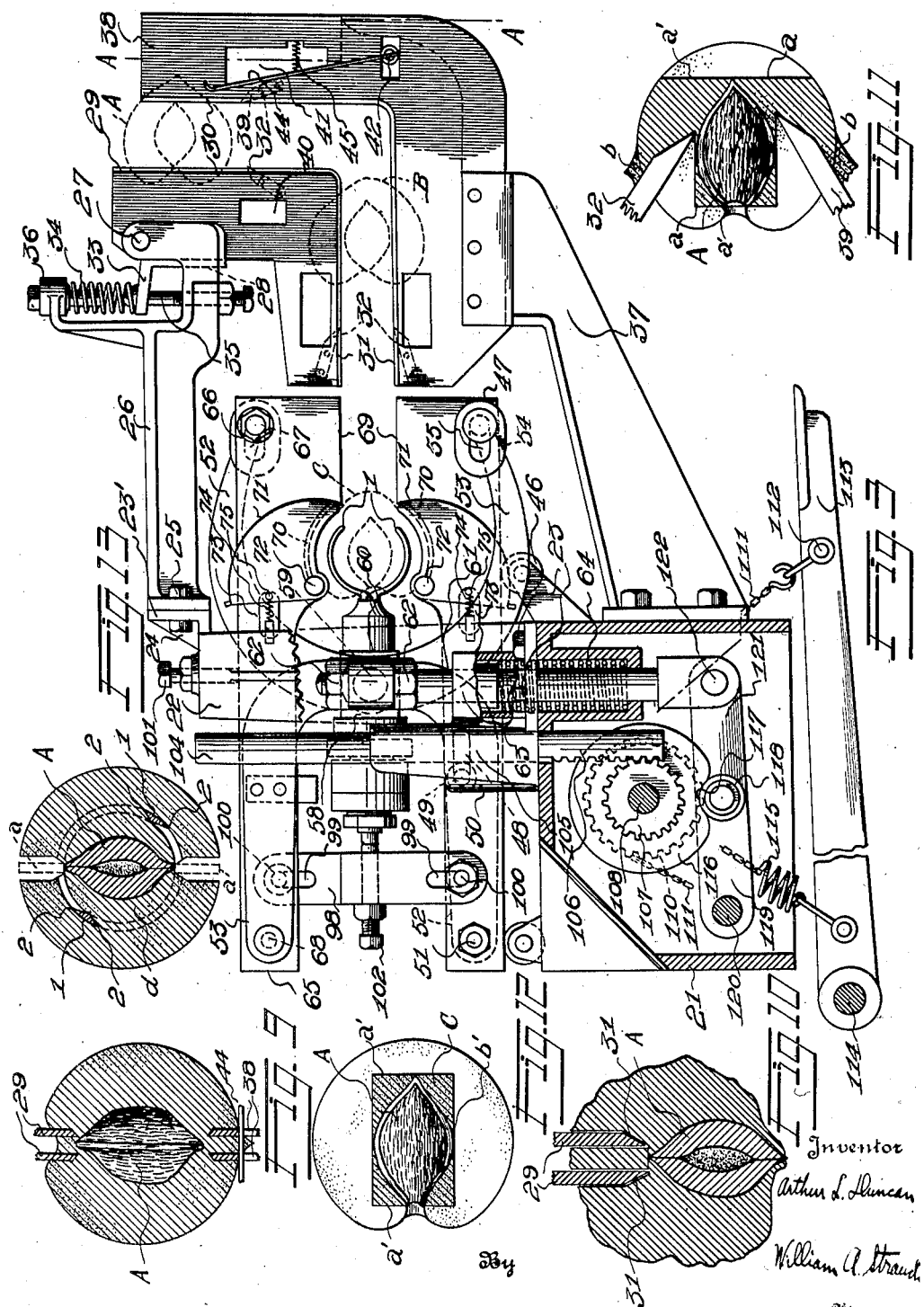

Dec. 16, 1930.   A. L. DUNCAN   1,785,003
FRUIT PITTING AND CORING METHOD AND APPARATUS
Filed Sept. 28, 1926   3 Sheets-Sheet 3
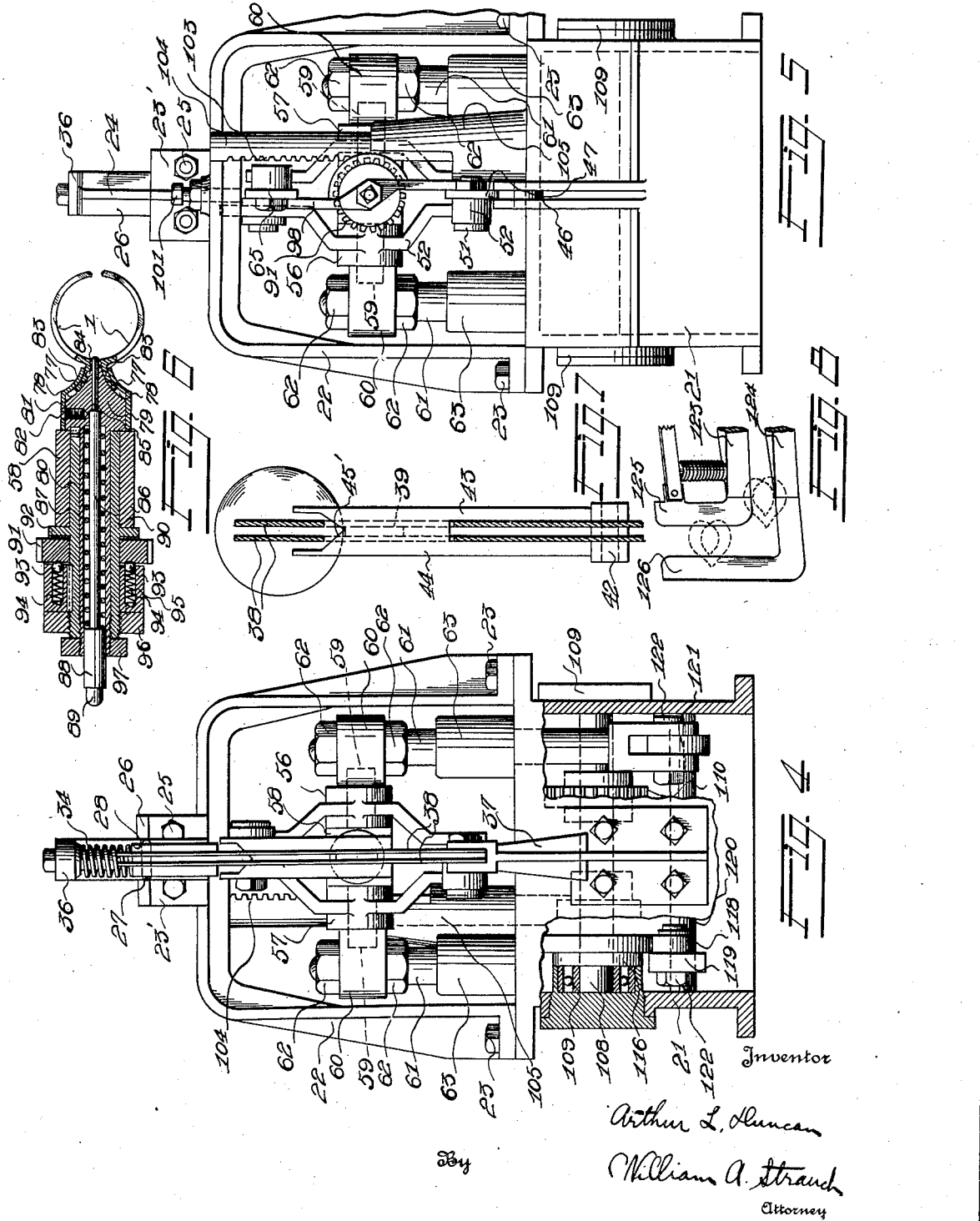

Patented Dec. 16, 1930

1,785,003

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING METHOD AND APPARATUS

Application filed September 28, 1926. Serial No. 138,211.

The present invention relates to improvements in fruit pitting and coring methods and apparatus therefor.

More particularly the invention relates to pitting and coring methods for the handling of single stone fruits, and particularly for pitting clingstone peaches. The present application is a continuation in part of the methods and apparatus disclosed in my copending applications Serial Nos. 756,175 filed December 16, 1924, and 79,428 filed January 5, 1926.

In the State of California alone 15 to 20 varieties of clingstone peaches are raised and each variety has a different shape pit. The pits range in diameter at the suture from three-quarters of an inch to one and three-quarter inches more or less according to the variety of peach, while every variety in turn has a range of about three-eighths of an inch variation in diameter at the suture according to the size of the peach in a particular shipment and the maturing conditions under which the peaches are raised. When peaches ripen they are not all of the same size in any one variety, and a box of peaches weighing from 40 to 45 pounds of the Phillips variety, for example, will ordinarily have peaches from approximately two and three-eighths inches in diameter to four and one-quarter inches in diameter, all in the same box, and all from the same tree. The pits from these peaches will range in the greatest diameter of the suture perpendicular to the stem and spike end of the pit from approximately one and one-sixteenth inches to one and seven-sixteenth inches, while the stem to the spike end of the pits will vary in length from one and three-eighths inches to one and three-quarter inches. Efforts to pit peaches in a commercial way and in large quantities with a single knife, not adjustable for the varying sizes of pits, results in a substantial waste as provision must be made to remove the largest pit and with the result that a substantial portion of useful flesh is cut from the peaches having the smaller pits.

In accordance with my improved methods of pitting and coring fruit set forth in the said copending applications, a central core comprising the substantially intact pit is severed from the remaining pulp by a cut or cuts starting from the plane of the suture of the pit. While my improved method as set forth in my copending applications may be carried out by utilizing a single non-adjustable knife, I have found because of wide variations in the size of the pit or seed in fruit to be cored and particularly in clingstone peaches, that substantial economies may be effected utilizing a severing means adjustable to the size of the pit to be removed, in the preferred embodiments of my present invention, a pair of oppositely disposed pitting knives adapted to adjustably encompass the substantially whole or intact pit of the fruit to be cored or pitted substantially in the plane of the pit suture is utilized. The severing means is adjusted until it substantially contacts with and generally conforms in curvature to the suture of the pit before starting the severing motion through the fruit. After the adjustment is effected substantially to the pit size a central core comprising the pit is severed from the remainder of the fruit by causing the severing means to move through the fruit without substantially varying its distance from an axis of rotation coinciding substantially with an axis of the fruit pit approximately through the stem and spike end of the pit hereinafter termed the longitudinal axis of the fruit or pit. By utilizing my double adjustable knife arrangement, I have found that when the knives are adjusted to encompass the pit with the knives pressed into engagement with a predetermined pressure against the suture of the pit, the fruit pit is centered between the encompassing knives, moreover, as the knives remain set in adjusted position with relation to the longitudinal axis of the fruit no obstructions are encountered by the knives due to pit irregularities, because the setting of the knives is to the maximum diameter of the pit. Thus breakage of the knives is prevented. A further advantage of my double adjustable knife arrangement is that the pit is freed from the fruit pulp without the necessity of the knives crossing the suture of the pit, thus avoiding breakages.

My improved method comprises in its preferred form the initial formation of a substantially peripheral groove or channel in the plane of the suture in which the severing means are entered and adjusted as above set forth. The groove or channel is formed by either a hand knife as set forth in my patents numbered 1,544,173 issued February 6, 1923; 1,534,507 issued April 21, 1925, or by the groove or channel forming apparatus set forth in my said copending applications, one form of which is particularly hereinafter set forth. It will be seen that my invention may be carried out by hand methods or with various types of machines, and the improved adjustable, and self-adjusting knife mechanisms hereinafter set forth are adaptable either for hand pitting knives or for knives useful in my improved pitting and coring machines.

Accordingly, a primary object of my invention is to provide improved methods of pitting and coring single stone fruits in which the pit is removed by severing a central core or section of varying size, predetermined by the pit size, from the remainder of the fruit pulp, and which may be carried out by hand and in various types of machines.

A further object of the invention is to provide improvements in pitting and coring knives whereby the knives may be adjusted to the size of the pit to be removed in the plane of its suture to predetermine the size of the core to be removed, and which are useful either as knives to be held in the hand of an operator, or may be applied in machines in which the knives are automatically adjusted to the size of the pit.

Further objects of the invention are such as will appear hereinafter in the detailed description of the preferred embodiments of the invention, and are such as are defined by the terms of the appended claims.

Referring to the drawings,

Figure 3 is a side elevation partially in section of a preferred arrangement of mechanism for carrying out the invention rapidly.

Figure 4 is a front elevation, partially in section of the form of invention shown in Figure 3.

Figure 5 is a rear elevation of the form of invention shown in Figure 3.

Figure 6 is a detail sectional view showing the supports and mountings for the pitting knives in the form of invention shown in Figure 3.

Figure 7 is a sectional view taken along line A—A of Figure 3.

Figure 8 shows a modified form of pulp separating knives adapted for use in place of the slice removing knives shown in Figure 3.

Figure 9 is a fragmental sectional view showing the position of parts as a fruit to be pitted enters between the pulp separating knives in Figure 3.

Figure 10 is a fragmental sectional view showing the manner in which the pulp separating knives enter the pulp of the fruit and illustrating the wedging effect of the beveled edges of the knives.

Figure 11 is a view showing the manner in which the sections of a circumferential slice are removed from the fruit by the slice removing knives.

Figure 12 is a sectional view illustrating the separated pulp of the fruit and the pulp remaining at the base of the channel formed in the fruit after it has passed between the pulp separating knives.

Figure 13 is a fragmental sectional view illustrating the wedging effect of the pulp separating knives, and the action of the pitting or coring knives in the form of invention shown in Figure 3.

Figure 1:
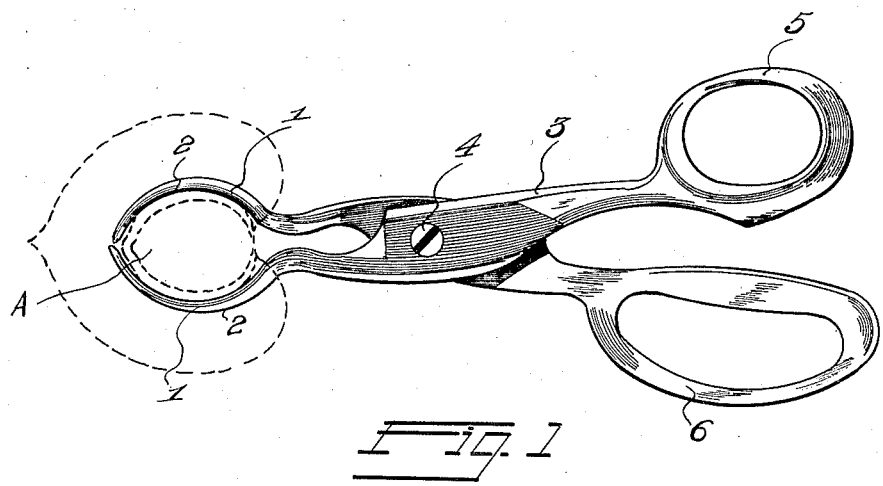
Figure 1 is a side elevation of a form of hand knife adapted for carrying out my improved invention.

As shown in Figure 1, a pair of oppositely disposed narrow knife blade sections 1 are shaped to conform substantially to the configuration of the suture of a pit "A" of a fruit to be cored. The knives 1 are sufficiently narrow to fit in a narrow groove or channel formed in the fruit substantially to the suture of the pit, and are preferably beveled outwardly to form cutting edges 2 as shown in Figure 13. Knives 1 are formed integrally with shear members 3 that are pivotally secured together by means of pivot pin 4. The shear members 3 are provided with the shear handle sections 5 and 6 to be grasped by the thumb and fingers respectively of the operator.

In utilizing this form of my invention, a groove or channel is first formed in the fruit in the plane of its suture in any one of the ways above set forth, substantially to the depth of the suture of the pit. The operator spreads handle sections 5 and 6, swinging knives 1 away from each other above the pivot pin 4 a sufficient distance to permit the positioning of the pit of the fruit to be cored between the curved sections of the knives 1. The operator then presses the handle sections 5 and 6 together, closing the knives 1 about the pit "A" of the fruit in the plane of its suture and with the longitudinal axis of the pit centered in the plane of and substantially centered between the knives as shown. The knives are brought together until they bear on the suture of the pit. The operator then causes a rotation of the knives 1 relative to the fruit substantially about the longitudinal axis of the fruit, with the knives held in their fixed or adjusted position with relation to the longitudinal axis of the fruit. As soon as the relative rotation of the fruit and knives starts, the knives penetrate the fruit pulp and can readily be held substantially at the initially fixed distance from the longitudinal axis of the fruit to remove a regularly shaped core including the pit that is substantially circular in section in planes normal to the longitudinal axis of the fruit, and that is no larger in diameter than the largest diameter of the pit. In this way a central regularly shaped core, comprising the substantially whole or intact pit is removed from the fruit at the completion of slightly less than a half revolution of relative rotation of the fruit and the knives, and the remainder of the pulp is divided into substantially equal halves with uniform central recesses, the walls of which are true surfaces of revolution. It is to be noted that the core is cut free just before the knives reach the projecting ledge of the opposite side of the suture of the pit. The fruit or pulp halves produced in this manner are of the attractive regular appearance so highly desired in high grade canned goods.

Figure 2:
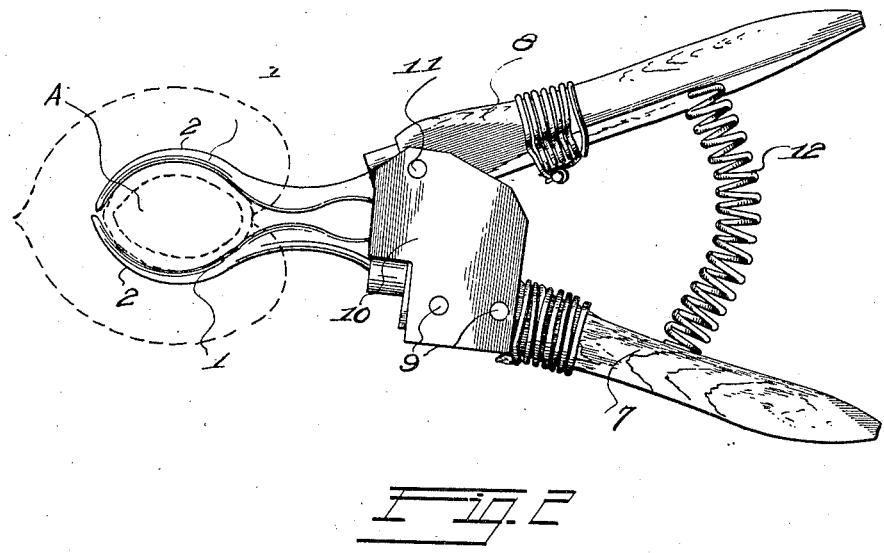
Figure 2 is a side elevation showing a form of a modified hand knife for carrying out my invention.

In the form of hand pitting knife shown in Figure 2, curved pitting knives 1 shaped as above set for'h, are removably secured in the ends of the handles 7 and 8. Secured to opposite sides of the handle 7 by means of the rivets 9 are guide plates 10 from which handle 8 is pivotally supported by means of the pivot pin 11. A helical spring 12 interposed between the handles 7 and 8 urges the handles apart, and the knives 1 together. To pit a suitably grooved or recessed peach, the operator presses handles 7 and 8 together, spreading the knives 1 sufficiently to enter them into the channel or groove formed in the plane of the suture of the fruit from the stem end. When the pit "A" of the fruit is properly positioned between the curved sections of the knives, the operator releases the handles and the spring 12 forces them outward, yieldingly closing the knives 1 against the suture of the pit "A" as shown. As soon as the relative rotation of the knives and fruit is started, the cutting edges of the knives enter opposite halves of the fruit pulp. Spring 12 is not sufficiently strong to move the knives inward through the flesh of the fruit towards the axis of rotation so that a uniform core substantially circular in section normal to the axis of rotation is severed from the fruit as above set forth. In this form of invention knives 1 of different shapes may be inserted for the handling of the different varieties of peaches.

Having described the manner of carrying out my improved pitting methods and apparatus for hand operation, a machine for carrying out my improved method and for utilizing my adjustable pitting knives will be described.

As shown in Figures 3, 4 and 5, a supporting casting or frame-work 21 has secured to the upper surface thereof a yoke or bracket 22 by means of bolts or cap screws 23. Formed on the upper part of bracket 22 is a securing flange 23' reinforced by a suitable rib 24. Secured to and projecting from flange 23 by means of bolts 25 is a supporting arm or bracket 26. Pivotally supported on extensions or ears of the arm or bracket 26 by means of the pin 27 is a knife supporting member 28 in which a pair of spaced angular slice removing and wedging knives 29 are secured. Knives 29 are provided with beveled wedging surfaces 31 (Figure 10) and are secured with their inner surfaces spaced apart a distance approximately equal to the thickness of a strip or slice that is desired to be removed from the fruit. The knives 29 are of such thickness that the outer surfaces thereof are spaced apart a distance equal to the width of the channel or groove to be formed in the pulp of the fruit for entry of the pitting knives and gripping and adjusting members as will hereinafter more fully appear. Ordinarily the cutting knives 29 are arranged to wedge the pulp apart a sufficient amount to form a channel or groove equal in width to about twice the width of the removed strip or slice (Figures 10 and 13). In practice a strip of about $\frac{3}{32}$ inch is preferably removed while the wedging action is sufficient to form a channel permitting entry of a pitting knife about one-quarter inch wide in the channel formed. Secured between the knives 29 are the slice removing knives 32 (Figure 3). Formed on the member 28 is an extension 33 which is held by means of spring 34 against an adjustable stop member 35 supported in an arm 26. One end of spring 34 abuts against the upper surface of extension 33 and the other end thereof abuts against the projection 36 of arm 26.

Supported from the frame or casting 21 by means of the bracket 37 are the spaced angular cutting knives 38. Knives 38 provided with beveled edges 31, are of the same thickness and have their inner surfaces in planes with the inner surfaces of blades 29. The cutting edges 30 of the blades 29 and 38 are substantially parallel and spaced apart a sufficient distance to permit the pits of fruit to be cored to pass between them with a line through the stem and spike ends of the pit substantially at right angles to the cutting edges 30, and edges 31 of the blades are substantially parallel and spaced apart a sufficient distance to permit the passage of a fruit with the stem and spike ends of the pit substantially midway between the edges 31 as indicated by the dotted line fruit positions shown in Figure 3. Secured between the inner surfaces of the blades 38 are the slice removing knives 39. Formed in the blades 29 and 38 are the openings or recesses 40 and 41 through which strips of pulp removed by the knives 32 and 39 may pass outward.

Pivotally supported from the plates 38 by means of a pivot pin 42 (Figures 3 and 7) are supporting extensions 43 of pulp trimming member 44. The extensions 43 straddle blades 38 and the body portion of member 44 passes through and is held by means of the compression spring 45, against the inner inclined edges of the recesses 41 in the knives 38. Formed in the upper end of the member 44 is a V-shaped trimming notch 45′ normally positioned so that it will trim the protruding spike formation from the pulp of the fruit as it is forced downward between the blades 29 and 38.

Supported above the upper surface of the frame work or casting 21 by rollers 46 is a gripping and adjusting member 47. Formed in member 47 is a guide slot 48 through which a supporting and guide pin 49 extends. Pin 49 is supported from projection 50 of the frame or casting 21 guiding and limiting reciprocating movement of gripping and adjusting member 47 on rollers 46 and holding it properly in position during the operation of the machine. The rear end of gripping member 47 is pivotally connected by a pin 51 to the end of a tong member 52 and the forward end of gripping member 47 is connected by means of a pin 54 extending slidably through slot 55 of the member 53. The tong members 52 and 53 are positioned on opposite sides of the carriage member 47 and at their centers are provided with the spaced supporting bosses 56 and 57 (Figures 4 and 5). Positioned between the bosses 56 and 57 is a pitting knife supporting block 58 provided with the trunnion members or pins 59 upon which bosses 56 and 57 are pivotally supported. The outer ends of pins 59 are journaled in actuating blocks 60. Blocks 60 are adjustably secured to the ends of vertical plunger rods 61 by means of the adjusting and securing nuts 62. Plungers 61 are slidably supported in cylindrical bores formed in the vertical guide and supporting members 63 of the frame 21. Seated within suitable recesses formed in the guide and supporting members 63 compression springs 64 are interposed between shoulders formed on the plungers 61 and seats formed in the members 63. Springs 64 normally hold plungers 61 in the position shown in the drawings.

Gripping member 65 positioned directly above member 47 is supported at its forward end by pin 66 secured thereto which fits slidably in slot 67 of tong member 52, and its pivotally supported at its rear end by means of pin 68 to the rear end of tong member 53. Gripping members 47 and 65 are normally positioned with edges 69 thereof substantially aligned with the cutting edges 31 of the knives 29 and 38. The ends of the members 47 and 65 adjacent knives 29 and 38 may be of a width equal to the width of the channel formed in a fruit after it has been forced between knives 29 and 38 so that as the fruit is forced past the end of the knives 29 and 38 the ends of the members 47 and 65 will enter in the channel formed in the fruit. If desired, the ends of members 47 and 65 may be wedge-shaped to exert a further wedging action on the divided halves of the pulp of the fruit. Formed in gripping members 47 and 65, back of the surfaces 69, are recesses 70 shaped to receive the adjustable jaw members 71. Jaw members 71 are pivotally secured to the members 47 and 65 by means of pins 72, and the sides thereof straddle and are preferably flush with the sides of members 47 and 65. Within slots or recesses 73 formed in gripping members 47 and 65 are the compression springs 74 which abut against pins 75 supported in the sides of the jaw members 71 and extending through the slots 73. Springs 74 normally force jaw members 71 about the pivots 72 until pins 75 engage the edges of the slots 73. Jaws 71 are free to move about pivots 72 against the tension of springs 54 to grip various size fruit pits and to force the curved pitting knives 1 into engagement with the suture of a pit as will hereinafter more fully appear.

Disposed between the jaw members 71 are the rotatable pitting knives 1 (Figures 3 and 6). Knives 1 are provided with curved supporting shanks 77 which fit slidably into slots 78 formed in the end 79 of a hollow rotating spindle 80. A cap 81 removably held in position by means of a screw member 82 holds shanks 77 of the knives 1 slidably in the slots 78. Formed on the inner surfaces of shanks 77 are a series of depressions 83 which are adapted to register with suitable projections 84 formed on an extension 85 of knife actuating and adjusting rod 86. Surrounding rod 86 and confined in a bore formed in the spindle 80 is a compression spring 87 which abuts against the end of a section 88 of rod 86 normally forcing the rod 86 together with extension 85 and actuating projection 89 thereof to the left in Figure 6 causing the projections 84 of the extension 85 to move the knives 1 together as shown in Figure 6. Spindle 80 is rotatably supported in a bore or journal formed in the supporting block 58. A driving pinion 91 rotatably mounted on the sleeve 90 is normally held against a friction surface 92 by means of the balls 93 and springs 94 seated in recesses formed in collar 95. Collar 95 is slidably keyed to sleeve 90. Collar 96 threaded on the end of sleeve 90 holds collar 95 in position and permits adjustment of the tension of springs 94. A nut 97 is provided on the end of hollow spindle 80 for locking the parts in assembled relation. A notch formed in the end of sleeve 90 into which a key fits, and which key is fastened to the hollow spindle 80 causes hollow spindle 80 carrying knives 1 to revolve by action of driving pinion 91.

A member 98 (Figures 3 and 5) provided with the slots 99 is secured to the gripping members 47 and 65 by means of the pins 100 which fit slidably into slots 99 and are secured in the members 47 and 65 respectively. Provided in the yoke 22 is the limit or stop screw 101. Members 98 and 101 limit the separating movement of the gripping members 47 and 65 under influence of the springs 64. Supported in the member 98 is an adjustable screw 102, the forward end of which engages the end of knife actuating extension 89 with gripping members 47 and 65 separated, compressing spring 86 and forcing the knives 1 apart a sufficient amount to permit the entry of the pit of the fruit to be cored between the knives 1 as indicated in Figure 3.

Driving pinion 91 for the knife blades 1 meshes with a rack 103 formed on a rack member 104 which is slidably supported for vertical motion in supporting member 105 of the frame 21. Formed on the bottom of rack member 104 is a driving rack 106 which meshes with and is driven by a pinion 107 which in turn is supported on and driven by a shaft 108 (Figure 3). Shaft 108 is journaled in suitable bearings 109 supported in the sides of the frame 21 and is driven in any suitable manner under control of the operator. As shown in the drawings, shaft 108 is driven by a sprocket wheel 110 which in turn is driven by a chain 111, secured at 112 to the forward end of a foot treadle 113. Treadle 113 is pivoted at 114 to a suitable support not shown, and chain 111 is secured at its other end by means of the spring 115 to treadle 113. Secured on and driven by the shaft 108 is a cam 116 in which a depression 117 is formed. A roller 118 seats in the depression 117 of cam 116 with the parts in the position shown in Figure 3. Roller 118 is secured intermediate the ends of and actuates an arm 119 which in turn is rigidly secured to and actuates a shaft 120 journaled in the frame 21. Secured to and actuated by the shaft 120 is an arm 121 (Figure 4) and the outer ends of arms 119 and 121 are connected by means of pins 122 to the lower ends of the actuating plungers 61.

Instead of the double bladed knives 29 and 38 arrangement for removing a slice from the fruit, single bladed angular wedging knives 123 and 124 such as are disclosed in Figure 8 preferably provided with the narrow cutting sections 125 and 126 may be substituted therefor.

In operation of the form of invention shown in Figures 3 to 7 on peaches, the fruit to be pitted is held with the plane of the crease preferably disposed substantially parallel to and between inner surfaces of the knife blades 29 and 38, with a line through the stem and spike end of the fruit substantially at right angles to the edges 30 of the knives and with the spike end of the fruit to the right as indicated by the dotted fruit position "A" in Figure 3. The fruit is forced downward between the blades and as indicated in Figure 11 a section of pulp "a" comprising the crease formation of the fruit is cut from the pulp and the pulp is wedged apart on each side a distance substantially equal to the thickness of the knives 29 and 38. As the fruit is forced past the V-shaped notch 45' of member 44, the spike formation on the pulp of the fruit will be trimmed off, and as it passes the first pair of gouges 32 and 39 the sections "a'" are cut free from the pulp lines "a" in Figure 11. Continued downward movement of the fruit aligns the pit with the space between the beveled cutting edges 31. The fruit is then forced forward between edges 31 with the stem and spike ends of the pit substantially midway between the edges 31 as indicated by the dotted fruit position "B". As the fruit passes the second pair of gouges 32 and 39 the slice sections "b" of pulp are removed along lines "b'" as indicated in Figure 11. After the pulp has passed the second pair of gouges 32 and 39, a channel will be completed around the fruit leaving a central core C of pulp encompassing the pit A to be removed as indicated in Figure 12. The fruit is forced from between knives 29 and 38 causing the pit of the fruit to pass between the edges 69 of the gripping members 47 and 65 and finally the fruit is positioned with the pit disposed between the cutting knives 1 as indicated at "C", with knives 1 in the plane of the suture of the pit. Foot treadle 113 is then depressed causing rotation of shaft 108. Initial rotation of shaft 108 actuates cam 116 and forces roller 118 out of cam depression 117 depressing arms 119 and 121 suddenly. Downward movement of the arms 119 and 121 causes depression of plungers 61 against the tension of springs 64 and lowers supporting trunnions and tong pivots 59 together with knife supporting block 58 and causes a closing of the tong members 52 and 53 and gripping members 47 and 65 to bring edges 69 into engagement. This movement of the gripping members 47 and 65 causes pivoted jaws 71 to enter the channel formed therein and to grip the fruit in the plane of the suture of the pit. It will be noted that springs 74 will permit the engagement of the fruit and knives 1 with a predetermined pressure and will then yield and rotate slightly about a pivot 72, in this way compensating for different sized pits. The closing motion of tong members 52 and 53 causes movement of pins 54 and 66 to the left and a corresponding leftward motion of the gripping members 47 and 65 and of the member 98 in Figure 3. This motion of member 98 relieves the pressure of the stop member 102 on knife actuating extension 89 and spring 87 will force rod 86 together with the extension 85 thereof to the left closing knives 1 until the central core "c" of adhering pulp (Figure 12) is engaged and compressed a sufficient amount to overcome the pressure of spring 87, and the pressure exerted by jaws 71 on the knives, pressing the knives into substantial engagement with the suture of the pit. After plungers 61 have been depressed as set forth and the knives adjusted to the suture of the pit, continued rotation of shaft 108 will drive pinion 107 to depress rack member 104, and downward movement of rack member 104 will cause rotation of driving pinion 91 causing the rotation of knives 1 through the pulp of the fruit in a path encompassing the central core to be removed including the pit as indicated in Figure 13, starting from the plane of the fin like edge or suture of the pit. After the knives 1 have turned through about 180°, the central core "d" will be severed from the separated halves and the separated trimmed pulp will fall free from the central core comprising the pit. The operator then may remove his foot from treadle 113 and the parts will be restored to the position shown in Figure 3 for another coring operation. It is to be noted that the strength of spring 87 is not sufficient to change the distance of the knives from the longitudinal axis of the fruit in their passage through the pulp so that a regularly shaped core substantially circular in section normal to the longitudinal axis is removed from the fruit, the size of the core being predetermined by the size of the pit in the plane of its suture.

In this form of the invention, the adjustment of the knives 1 about the suture of the pit of a fruit to be cored centers the fruit so that normally no obstructions will be encountered by the pitting knives in their rotation through the pulp of the fruit, and the core is freed just before the knives complete a half revolution and reach the opposite projecting ledge of the suture or plane of greatest area. When an unusual obstruction is encountered the ball members 93 will unseat from the recesses formed in the gear 91 breaking the driving connection between gear 91 and the pitting knives 1. After the obstruction has been removed from the machine, the knives are turned so that the balls 93 will snap back into the recesses of the gear 91 re-establishing the driving connection, with the knives 1 properly aligned in normal position between the jaws 71. In power operated machines controlled by a single revolution clutch such for example, as is shown in my copending application Serial No. 130,442, filed August 20, 1926, I have found that the clutch between the knife carrying head and its driving gear may be eliminated and the machine may be driven through a loose belt that will slip when the knife strikes an obstruction, or it may be driven from a main power shaft through a friction clutch that will slip when the knives encounter unusual obstructions.

It will be apparent to those skilled in the art that wide variations may be made from the details herein before disclosed without departing from the spirit of my invention.

Accordingly, having described preferred embodiments only of the invention, what is desired to be secured by Letters Patent and claimed as new is:

1. The method of pitting peaches which consists in cutting a narrow kerf in the flesh of the peach to expose the suture of the pit, adjusting a severing means to the size of the whole pit in the plane of its suture and then simultaneously cutting both halves of the peach from the whole pit by a revolution of the severing means that ends without crossing the edge of the pit in said plane.

2. The method defined in claim 1 in which in the final step any point on the severing means follows an arc of a circle whose center lies substantially on the major axis of the pit.

3. The method of coring fruit which consists in forming a circumferential kerf in the flesh of the fruit substantially to the edge of the core, inserting a severing means substantially surrounding said core in said kerf, adjusting said means to said core, and then revolving said severing means through a half revolution to simultaneously sever both halves of the fruit from the core.

4. The method of cutting the core from single stone fruit, which comprises adjusting severing means to substantially encompass and contact with the edges of the stone in the plane of its suture and then rotating the severing means through a half revolution to cut a core from the fruit the size of which is determined by the size of the stone in the plane of its suture.

5. The method of cutting the core including the stone from single stone fruit which comprises adjusting severing means to substantially encompass the stone in the plane of it suture and then rotating the severing means through a half revolution about an axis that is approximately coincident with the major axis of said stone in the plane of its suture.

6. In combination, a pair of blades mounted for movement toward and from each other, each blade being curved to approximate the outline of the stone in the plane of its suture and being provided with a cutting edge on one side and means to cause said blades to move toward each other until they are substantially in contact with the edge of the stone in the plane of its suture and for rotating said blades through a half revolution from their position substantially in contact with the edge of the stone.

7. In combination, a pair of blades mounted for yielding movement toward and from each other, each blade being curved to approximate the outline of the stone in the plane of its suture and being provided with a cutting edge on one side, said blades being formed to substantially encompass the stone of the fruit in the plane of its suture, and means to cause said blades to move toward each other until they are substantially in contact with the edge of the stone and for rotating said blades through a half revolution from their position substantially in contact with the edge of the stone.

8. In a device of the class described, the combination of means for cutting the flesh of a fruit in the plane of suture of the fruit to form two halves held together by the intact pit, pitting means adapted to be received in the cut so formed, means for adjusting the pitting means in accordance with the pit of the fruit, and means for actuating the pitting means to sever the halves from the pit of the fruit.

9. In a device of the class described, the combination of means for cutting the flesh of the fruit in the plane of suture of the fruit pit, opposed flexible pitting members adapted to be received in the cut so formed, means for adjusting the flexible pitting members to form a loop determined by the pit of the fruit, and means for actuating the pitting members to sever the halves of the fruit from the intact pit to permit the halves of the fruit to fall from the pit.

10. In a device of the class described, the combination of a holding member having a recess to receive the pit of the fruit and adapted to hold the pit from within a cut formed in the plane of suture of the pit of the fruit, a pair of flexible pitting members adapted to be received in said cutting means for adjusting the curved pitting members to form a loop determined by the pit of the fruit, and means for actuating the pitting members to sever the halves of the fruit from the pit and permit the halves of the fruit to fall from the pit.

11. A machine for pitting single stone fruit which includes severing means, means for adjusting the severing means to the suture of the pit, means for rotating the adjusted severing means through the flesh of the fruit about a longitudinal axis while the fruit is maintained stationary substantially through the stem and spike end of the pit without substantially varying the distance of the severing means from said axis.

12. In a machine for pitting cling-stone peaches, which comprises means for separating the pulp of the fruit from the plane of suture of the pit substantially to the depth of the pit to be removed, severing means adapted to enter the flesh of the fruit between the separated halves thereof, means for forcing the severing means into substantial engagement with the suture of the pit from opposite sides thereof to adjust the severing means to the size of the pit to be removed, and means for rotating the adjusted severing means to sever a central core comprising the pit to be removed from the fruit.

13. In a fruit pitter, the combination of a fruit pitting knife comprising a holder, two curved blades carried by said holder, said curved blades forming a loop between them, means to cause said blades to approach and recede from each other in contact with the thin edge of the pit of a fruit whereby the size of the loop may be varied in accordance with the size of the pit.

14. In a knife pitting machine, the combination of a fruit pitting knife, including a pluralty of curved blades, means to yieldingly cause said blades to approach each other until said blades contact with the pit of the fruit disposed between them, means to revolve said blades in the same direction, and means to retract the said blades.

15. A fruit pitting machine including a fruit pitting knife having a plurality of blades, each blade being curved to approximate the form of a half of the fruit pit in the plane of its suture, means to yieldingly cause said blades to approach each other until said blades contact with the pit of the fruit disposed between them, means to simultaneously revolve said blades in the same direction, and means to retract said blades.

In testimony whereof I affix my signature.

ARTHUR L. DUNCAN.